(12) United States Patent
O'Keeffe et al.

(10) Patent No.: US 11,237,419 B2
(45) Date of Patent: Feb. 1, 2022

(54) SWITCHABLE LIGHT MODULATOR COMPRISING A POLYMER WALL STRUCTURE HAVING A MOULD PART AND A CAST PART DISPOSED BETWEEN FIRST AND SECOND SUBSTRATES

(71) Applicant: E INK CORPORATION, Billerica, MA (US)

(72) Inventors: Donal Martin O'Keeffe, Clare (IE); Timothy O'Keeffe, Clare (IE)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 17/193,051

(22) Filed: Mar. 5, 2021

(65) Prior Publication Data

US 2021/0278720 A1    Sep. 9, 2021

(30) Foreign Application Priority Data

Mar. 5, 2020  (GB) .................................... 2003224

(51) Int. Cl.
*G02F 1/1333*     (2006.01)
*G02F 1/1341*     (2006.01)

(52) U.S. Cl.
CPC ...... *G02F 1/133377* (2013.01); *G02F 1/1341* (2013.01); *G02F 1/133354* (2021.01)

(58) Field of Classification Search
CPC ......... G02F 1/133377; G02F 1/133354; G02F 2203/50; G02F 2202/022; G02F 2201/122; G02F 1/01708; G02F 1/361
See application file for complete search history.

(56) References Cited

U.S. PATENT DOCUMENTS

| 4,418,346 A | 11/1983 | Batchelder |
| 5,626,772 A | 5/1997 | Bongaerts et al. |
| 5,872,552 A | 2/1999 | Gordon, II et al. |

(Continued)

FOREIGN PATENT DOCUMENTS

| EP | 1462847 A1 | 9/2004 |
| EP | 2998786 A1 | 3/2016 |

(Continued)

OTHER PUBLICATIONS

United Kingdom Intellectual Property Office, "Combined Search and Examination Report under Sections 17 and 18(3)", Application No. GB2003224.9, dated Sep. 2, 2020.

(Continued)

*Primary Examiner* — Paul C Lee
(74) *Attorney, Agent, or Firm* — Brian D. Bean

(57) ABSTRACT

A switchable light modulator device (201, 202, 203, 204, 205) comprises a first substrate (101, 102, 103) and a second substrate (141, 142, 143, 144) with opposite major surfaces spaced apart by one or more polymer structures that each comprise two or more parts and define wall features (21b, 22b, 23b) for a plurality of cavities (111, 112, 113, 114), the cavities sealing a fluid (71, 72, 73, 74) or gel in discrete volumes. Each of the one or more polymer structures comprises a mould part (21, 22, 23) bonded to the first substrate and defining a recess (31, 32, 33), and a cast part (81, 82, 83, 84) filling the recess and bonded to the second substrate and a surface of the recess, the cast part being defined by the surface of the recess and the second substrate replicating the surfaces of both.

44 Claims, 9 Drawing Sheets

(56) References Cited

U.S. PATENT DOCUMENTS

| | | | |
|---|---|---|---|
| 6,130,774 A | 10/2000 | Albert et al. | |
| 6,144,361 A | 11/2000 | Gordon, II et al. | |
| 6,172,798 B1 | 1/2001 | Albert et al. | |
| 6,184,856 B1 | 2/2001 | Gordon, II et al. | |
| 6,241,921 B1 | 6/2001 | Jacobson et al. | |
| 6,271,823 B1 | 8/2001 | Gordon, II et al. | |
| 6,672,921 B1 | 1/2004 | Liang et al. | |
| 6,788,449 B2 | 9/2004 | Liang et al. | |
| 6,866,760 B2 | 3/2005 | Paolini, Jr. et al. | |
| 6,922,276 B2 | 7/2005 | Zhang et al. | |
| 6,930,818 B1 | 8/2005 | Liang et al. | |
| 6,934,067 B2 | 8/2005 | Ash et al. | |
| 6,982,178 B2 | 1/2006 | LeCain et al. | |
| 7,002,728 B2 | 2/2006 | Pullen et al. | |
| 7,012,600 B2 | 3/2006 | Zehner et al. | |
| 7,072,095 B2 | 7/2006 | Liang et al. | |
| 7,075,502 B1 | 7/2006 | Drzaic et al. | |
| 7,116,318 B2 | 10/2006 | Amundson et al. | |
| 7,144,942 B2 | 12/2006 | Zang et al. | |
| 7,170,670 B2 | 1/2007 | Webber | |
| 7,236,291 B2 | 6/2007 | Kaga et al. | |
| 7,312,784 B2 | 12/2007 | Baucom et al. | |
| 7,321,459 B2 | 1/2008 | Masuda et al. | |
| 7,369,299 B2 | 5/2008 | Sakurai et al. | |
| 7,411,719 B2 | 8/2008 | Paolini, Jr. et al. | |
| 7,417,787 B2 * | 8/2008 | Chopra | G02F 1/167 359/296 |
| 7,453,445 B2 | 11/2008 | Amundson | |
| 7,495,819 B2 | 2/2009 | Sakurai et al. | |
| 7,525,719 B2 | 4/2009 | Yakushiji et al. | |
| 7,535,624 B2 | 5/2009 | Amundson et al. | |
| 7,646,358 B2 | 1/2010 | Hattori et al. | |
| 7,646,530 B2 | 1/2010 | Takagi et al. | |
| 7,679,814 B2 | 3/2010 | Paolini, Jr. et al. | |
| 7,715,088 B2 | 5/2010 | Liang et al. | |
| 7,839,564 B2 | 11/2010 | Whitesides et al. | |
| 8,009,348 B2 | 8/2011 | Zehner et al. | |
| 8,508,695 B2 | 8/2013 | O'Keeffe | |
| 8,643,939 B2 | 2/2014 | Hayashi | |
| 8,837,032 B2 | 9/2014 | Lam et al. | |
| 8,873,130 B2 | 10/2014 | Kim et al. | |
| 9,104,072 B2 | 8/2015 | Hashimoto | |
| 9,279,906 B2 | 3/2016 | Kang | |
| 9,529,242 B2 | 12/2016 | Nakashima | |
| 10,067,398 B2 | 9/2018 | O'Keeffe | |
| 10,444,553 B2 | 10/2019 | Laxton | |
| 10,444,590 B2 | 10/2019 | Duthaler et al. | |
| 10,509,242 B2 * | 12/2019 | O'Keeffe | G02F 1/0107 |
| 10,809,590 B2 | 10/2020 | Widger et al. | |
| 2006/0087479 A1 | 4/2006 | Sakurai et al. | |
| 2006/0087489 A1 | 4/2006 | Sakurai et al. | |
| 2006/0209008 A1 | 9/2006 | Nihei et al. | |
| 2006/0214906 A1 | 9/2006 | Kobayashi et al. | |
| 2009/0268303 A1 * | 10/2009 | Takai | G02B 3/14 359/626 |
| 2013/0265536 A1 * | 10/2013 | Hashimoto | G02F 1/133502 349/153 |
| 2015/0005720 A1 | 1/2015 | Zang | |
| 2015/0277160 A1 * | 10/2015 | Laxton | G02F 1/09 359/296 |
| 2016/0012710 A1 | 1/2016 | Lu et al. | |
| 2017/0277012 A1 | 9/2017 | Huh et al. | |
| 2018/0173074 A1 * | 6/2018 | Zhang | G02F 1/13394 |
| 2018/0366069 A1 | 12/2018 | Widger et al. | |
| 2019/0256625 A1 | 8/2019 | Abbott, Jr. et al. | |

FOREIGN PATENT DOCUMENTS

| | | | | |
|---|---|---|---|---|
| JP | 2005242207 A | 9/2005 | | |
| JP | 5285517 B2 * | 9/2013 | | H04N 21/431 |
| JP | 6410213 B2 * | 10/2018 | | B01J 20/0237 |
| WO | 2004079442 A1 | 9/2004 | | |

OTHER PUBLICATIONS

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Korean Intellectual Property Office, "International Search Report and Written Opinion", PCT/US2021/021019, dated Jun. 25, 2021.

* cited by examiner

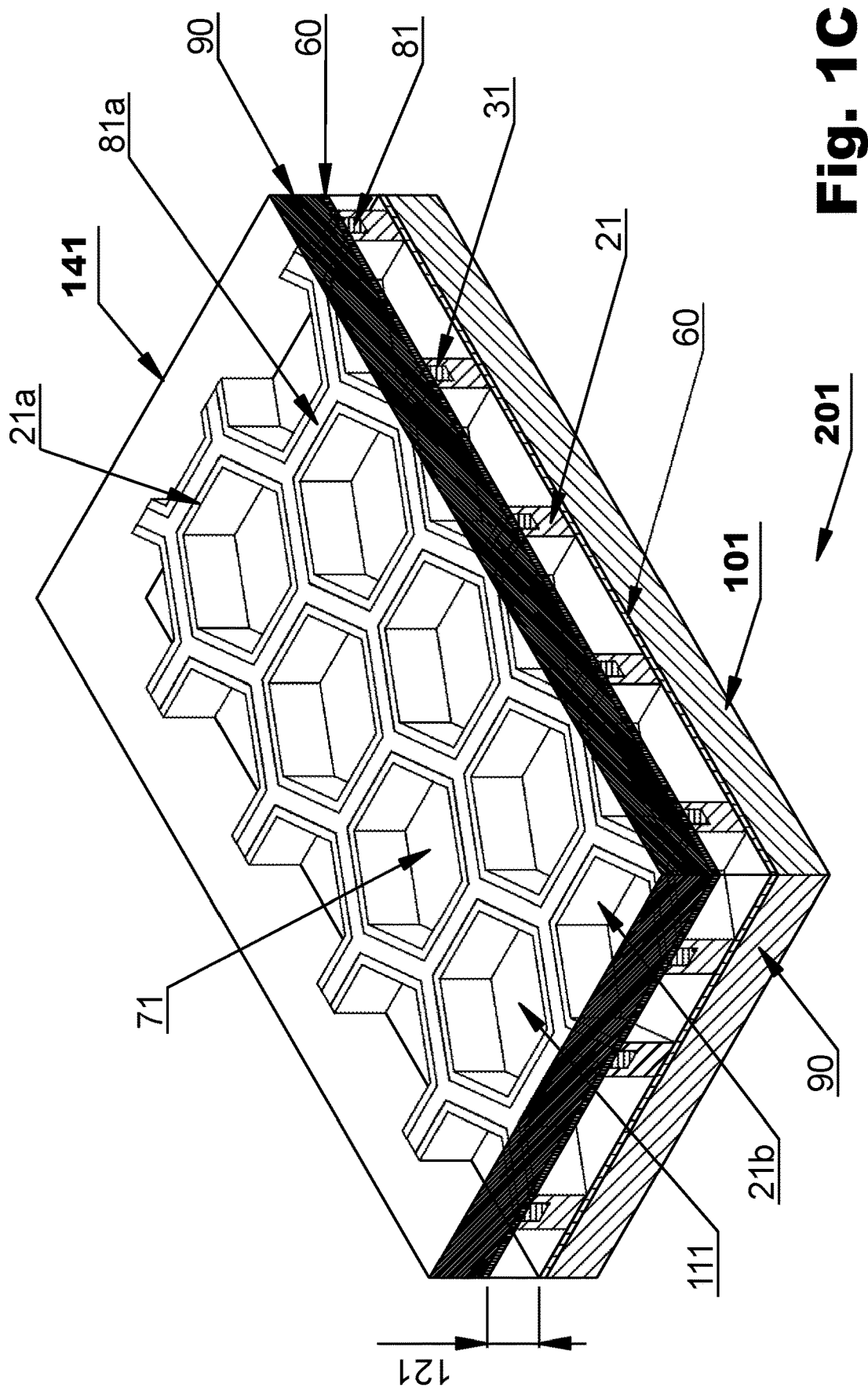

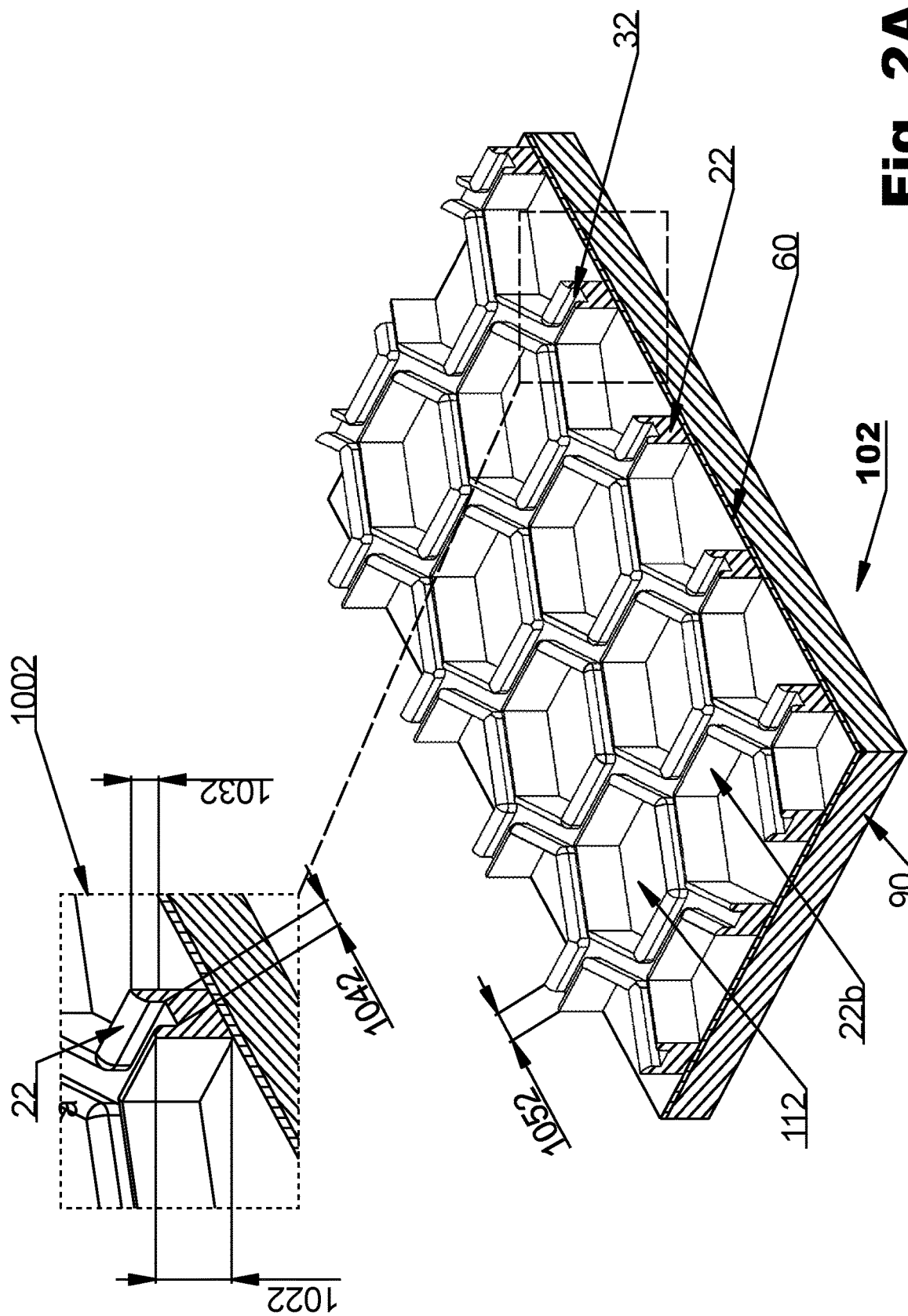

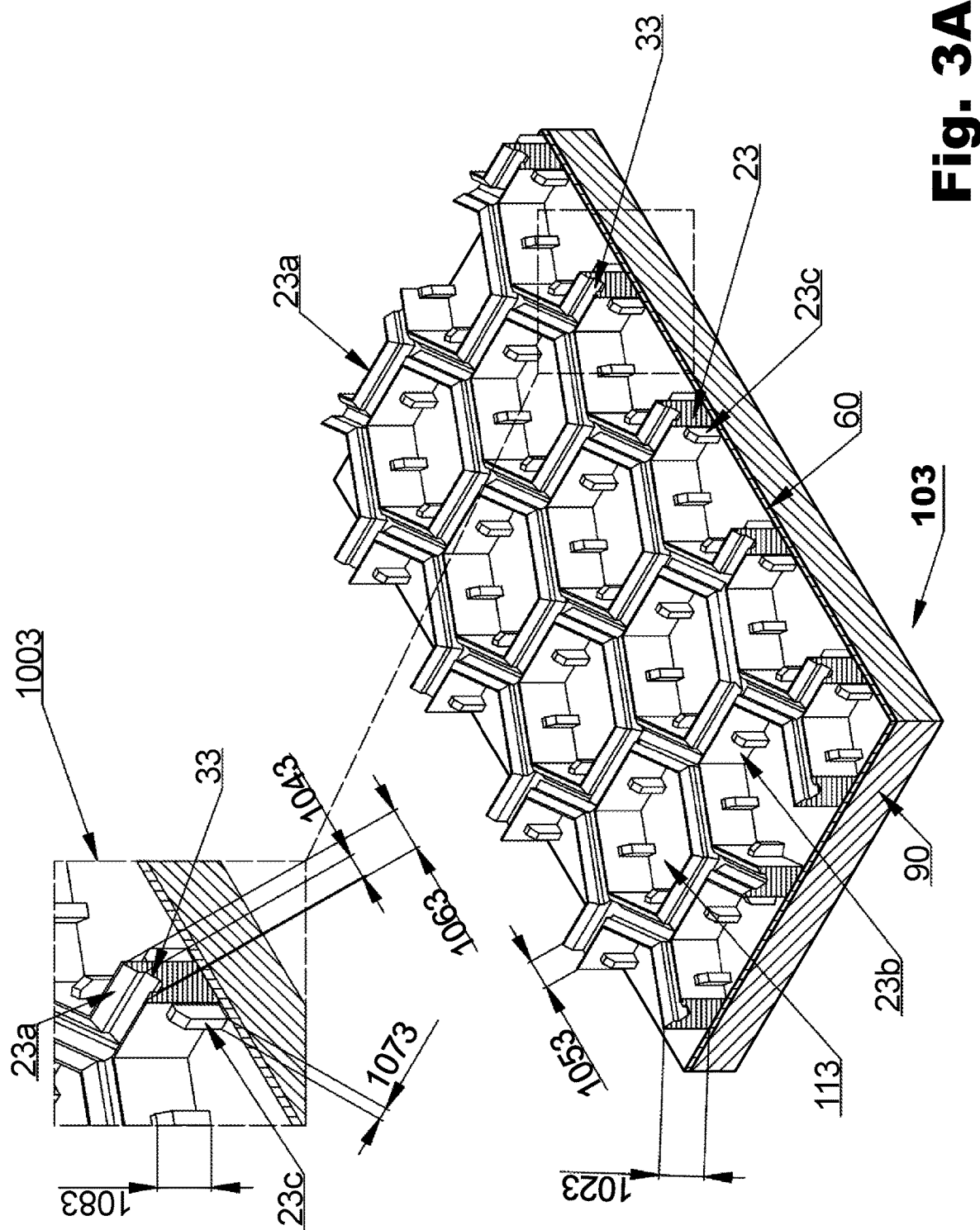

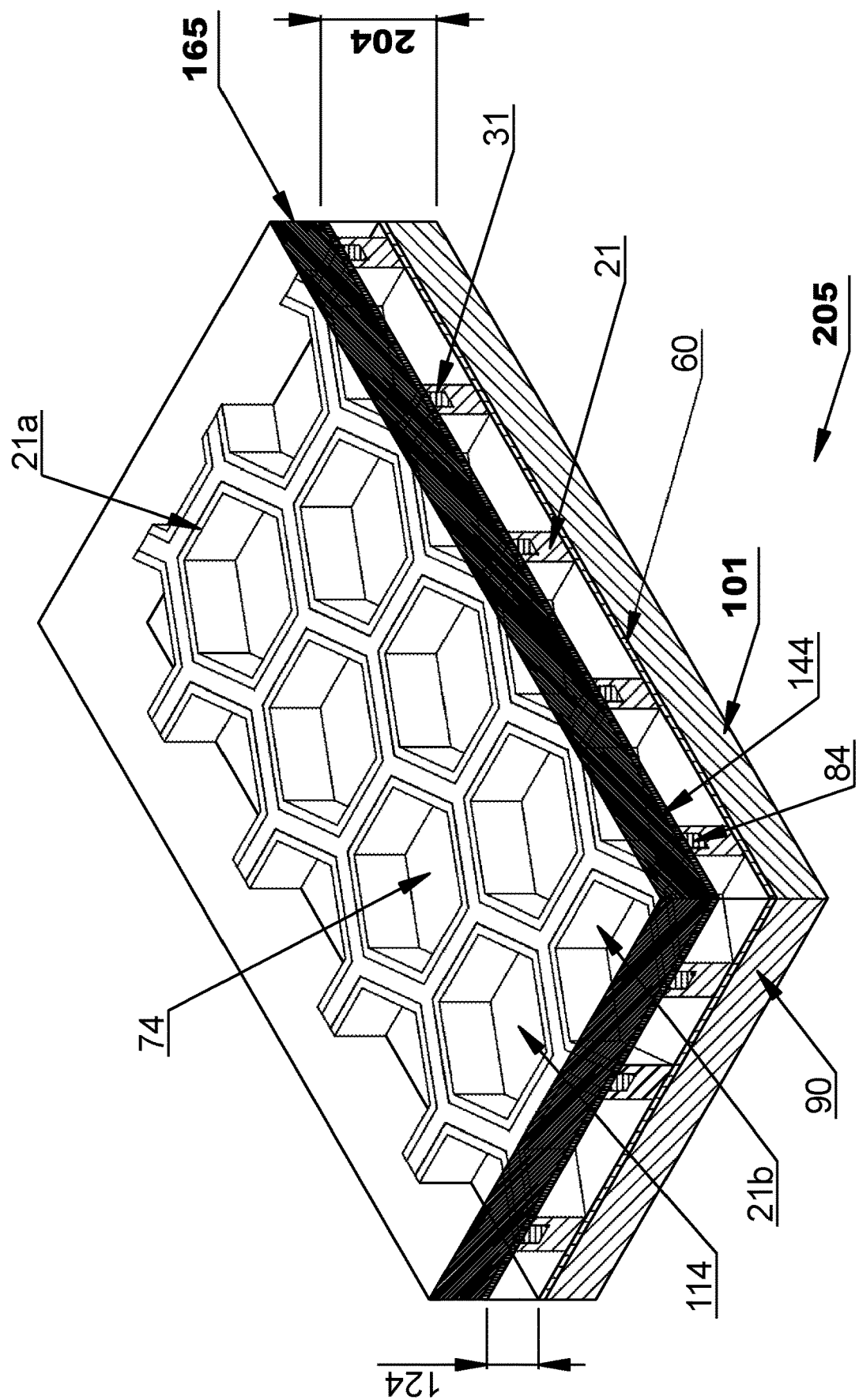

SWITCHABLE LIGHT MODULATOR COMPRISING A POLYMER WALL STRUCTURE HAVING A MOULD PART AND A CAST PART DISPOSED BETWEEN FIRST AND SECOND SUBSTRATES

CROSS-REFERENCE TO RELATED APPLICATIONS

This application claims the benefit of and priority to Great Britain Patent Application Ser. No. 2003224.9 filed on Mar. 5, 2020, the contents of which are incorporated by reference herein in its entirety.

FIELD OF THE INVENTION

The present invention relates to light modulator devices that are optically switchable and comprise a fluid or gel layer, and especially to devices that have flexible substrates. Such devices preferably have a polymer structure within the viewing area to maintain the gap between the substrates and to support handling in use including bending and laminating to glass or another substrate. Examples of product applications include switchable smart windows, outdoor information displays, and flexible display devices.

BACKGROUND OF THE INVENTION

This invention relates to light modulators, that is to say to variable transmission windows, mirrors and similar devices designed to modulate the amount of light or other electromagnetic radiation passing there through. For convenience, the term "light" will normally be used herein, but this term should be understood in a broad sense to include electromagnetic radiation at non-visible wavelengths. For example, as the present invention may be applied to provide windows which can modulate infra-red radiation for controlling temperatures within buildings. More specifically, this invention relates to light modulators which use particle-based electrophoretic media to control light modulation. Examples of electrophoretic media that may be incorporated into various embodiments of the present invention include, for example, the electrophoretic media described in U.S. Pat. No. 10,809,590 and U.S. Patent Publication No. 2018/0366069, the contents of both of which are incorporated by reference herein in their entireties.

In the prior art, solutions that have polymer structure in the fluid or gel layer, and suitable for use with the invention include U.S. Pat. No. 8,508,695 to Vlyte Innovations Ltd., which discloses dispersing fluid droplets (1 to 5 microns in diameter) in a continuous polymer matrix that is cured in place to both substrates, to contain liquid crystals. Additionally, U.S. Pat. No. 10,809,590 to E Ink Corporation discloses microencapsulating fluid droplets and deforming them to form a monolayer of close packed polymer shells in a polymer matrix on one substrate and subsequently applying an adhesive layer to bond the capsule layer to a substrate. Also EP1264210 to E Ink California discloses embossing a micro-cup structure on one substrate, filling the cups with fluid having polymerizable components and polymerizing the components to form a sealing layer on the fluid/cup surface, then applying an adhesive layer to bond to the second substrate. Additionally, EP2976676 to Vlyte Innovations Ltd. discloses forming a wall structure on one substrate, coating the tops of walls with adhesive, filling the cavities defined by the walls with fluid, and polymerizing the adhesive to bond the tops of walls to the opposing substrate.

Many of these prior art solutions impose limitations in order to provide a workable solution for isolating one specific fluid (e.g., liquid crystal (LC)) for one specific application (e.g. switchable LC film). In order to do this, all of the above solutions expose the electro-optical fluid to prepolymer components and a polymerization step. This forces compromises and adds complexity. For example, the electro-optical fluid components must not participate in or hinder the polymerization and the prepolymer components must phase separate from the fluid on polymerization and somehow form solid polymer structure in defined areas (e.g. only on the fluid surface of a micro-cup). In addition, it can be difficult to develop strong chemical bonds to the surface of substrates in the presence of a fluid because the fluid can preferentially wet the surface undermining peel adhesion. Furthermore, there will be residual components, including unused monomer, low molecular weight polymer, and nanoparticles from a polymerization step conducted in contact with the fluid that can contaminate or otherwise compromise switching of the electro-optical fluid. All of these conditions can lead to failure of the end product, because of lack of optical activity, delamination, or leakage of the internal fluid.

In EP3281055, to Vlyte Innovations Ltd., the electro-optical fluid is not exposed to a polymerization step. EP3281055 describes a flexible device including solid polymer microstructures embedded in its viewing area and the microstructures are on both substrates. The microstructures join (i.e. fasten) the substrates of the device to each other by engaging with each other over a length orthogonal to the substrates. The joined microstructures incorporate a wall structure that divides a device's fluid layer into a monolayer of discrete volumes contained within corresponding cavities. This provides the device with significant structural strength. In the method described, mating microstructures (i.e. male and female parts) are formed on each substrate, then precisely aligned with each other and joined in a press fit that also seals the fluid layer in the cavities. As noted earlier, the electro-optical fluid is not exposed to a polymerization step. A limitation of the method is that it requires precise alignment and dimensional stability in the X and Y axis of the faces to be joined over large distances, typically over one or more meters in smart glass applications.

Particle-based electrophoretic displays, in which a plurality of charged particles move through a suspending fluid under the influence of an electric field, have been the subject of intense research and development for a number of years. Such displays can have attributes of good brightness and contrast, wide viewing angles, state bistability, and low power consumption when compared with liquid crystal displays. The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. patent application Ser. No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Microcell structures, wall materials, and methods of forming microcells; see for example U.S. Pat. Nos. 7,072,095 and 9,279,906;
(d) Methods for filling and sealing microcells; see for example U.S. Pat. Nos. 7,144,942 and 7,715,088;
(e) Films and sub-assemblies containing electro-optic materials; see for example U.S. Pat. Nos. 6,982,178 and 7,839,564;
(f) Backplanes, adhesive layers and other auxiliary layers and methods used in displays; see for example U.S. Pat. Nos. 7,116,318 and 7,535,624;
(g) Color formation and color adjustment; see for example U.S. Pat. Nos. 7,075,502 and 7,839,564;
(h) Methods for driving displays; see for example U.S. Pat. Nos. 7,012,600 and 7,453,445;
(i) Applications of displays; see for example U.S. Pat. Nos. 7,312,784 and 8,009,348; and
(j) Non-electrophoretic displays, as described in U.S. Pat. No. 6,241,921 and U.S. Patent Applications Publication No. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. application Ser. No. 2002/0075556, both assigned to SiPix Imaging, Inc.

Electrophoretic media are often opaque (since, for example, in many electrophoretic media, the particles substantially block transmission of visible light through the display) and operate in a reflective mode. However, electrophoretic devices can also be made to operate in a so-called "shutter mode," in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. In particular, when this "shutter mode" electrophoretic device is constructed on a transparent substrate, it is possible to regulate transmission of light through the device.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

One potentially important market for electrophoretic media is windows with variable light transmission. As the energy performance of buildings and vehicles becomes increasingly important, electrophoretic media could be used as coatings on windows to enable the proportion of incident radiation transmitted through the windows to be electronically controlled by varying the optical state of the electrophoretic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

SUMMARY OF THE INVENTION

Described herein is an improved architecture for a switchable light modulator that can be used for a window, mirror, display, sun shade, or sign, among many other applications. In particular, the described design is more robust than variable transmission devices such as electrochromic films, and provides a better viewing experience due to an improved clear (open state) with reduced haze.

In a first aspect, the switchable light modulator includes a first substrate having a first major surface, a second substrate having a second major surface, a polymer wall structure having a top and a bottom. The polymer wall structure is disposed between the first major surface and the second major surface, thereby creating a plurality of cavities that contain a modulating fluid or a modulating gel in discrete volumes within the cavities. The polymer wall structure includes a mould part defining a recess along the top of the polymer wall structure, and a cast part formed by disposing a fluid pre-cursor into the recess and filling the recess, and subsequently curing the fluid pre-cursor to bond the second substrate to a surface of the recess. In one embodiment, the bottom of the polymer wall structure is bonded to the first substrate. In one embodiment, the fluid pre-cursor does not contact the modulating fluid or the modulating gel. In one embodiment, the fluid pre-cursor extends beyond side walls defining the recess, and into the cavity. In one embodiment, the mould part is optically transparent and the cast part obscures light and includes a colorant, a filler material, or a light scattering material. In one embodiment, the mould includes a colorant, and the colorant matches a colour of a particle that is disposed in the modulating fluid or modulating gel. In one embodiment, the fluid pre-cursor comprises an elastomeric polymer having a glass transition temperature (Tg) less than 20° C. In one embodiment, the elastomer polymer is a polyurethane. In one embodiment, the recess has a maximum depth that is greater than or equal to 5% of the orthogonal distance between the first major surface and the second major surface. In one embodiment, the cavities are between 0.3 mm and 3 cm in longest dimension, and the center-to-center distance of adjacent cavities is between 0.6 mm and 10 cm.

In one embodiment, mould parts have differences in the respective shapes of their recesses including variation in the depth and width of the recesses. In one embodiment, the polymer wall structures additionally include bracing features. In one embodiment, the first substrate or the second substrate comprises a flexible transparent material. In one embodiment, the switchable light modulator has a first state that strongly attenuates light, and a second state that is substantially transparent to visible light. In one embodiment, the modulating fluid or the modulating gel includes electrophoretic particles, liquid crystals, a combination of polar and non-polar liquids, an electrochromic fluid, a thermochromic fluid, or a photochromic fluid.

In another aspect a method of making a switchable light modulator. The method includes providing a first substrate including a first major surface, providing a second substrate including a second major surface, providing a polymer wall structure having a top and a bottom, wherein the polymer wall structure includes a mould part that defines a recess along the top of the polymer wall structure, filling the recess with a fluid pre-cursor, providing a modulating fluid or modulating gel in discrete volumes within said plurality of cavities, disposing the polymer wall structure between the first major surface and the second major surface, and curing the fluid pre-cursor to bond the second substrate and a surface of the recess together. In one embodiment, the wall structure is bonded to the first substrate before the step of providing a modulating fluid or modulating gel in discrete volumes within said plurality of cavities. In one embodiment, curing the fluid pre-cursor to bond the second substrate and a surface of the recess together comprises heating the fluid pre-cursor or exposing the fluid precursor to UV light. In one embodiment, disposing the polymer wall structure between the first major surface and the second major surface further includes compressing the polymer wall structure between the first and second substrates with a roller.

In another aspect, a switchable light modulator device having a first substrate and a second substrate with opposite major surfaces spaced apart by one or more polymer structures that each comprise two or more parts and define wall features for a plurality of cavities, said cavities sealing a fluid or gel in discrete volumes, wherein each of said one or more polymer structures comprises a mould part bonded to said first substrate and defining a recess, and its cast part filling said recess and bonded to said second substrate and a surface of said recess, said cast part being enclosed by said surface of said recess and said second substrate replicating the surfaces of both.

In a further aspect, there is provided a switchable light modulator device. In some embodiments, the mould part is optically transparent (i.e. comprising only optically transparent polymer) and the cast part obscures light. Light is obscured by the cast part by dispersing or solubilizing in its polymer structure one or more of: a colorant, a filler material, or a light scattering material. Preferably, the color of the colorant is selected to match the color or tint of one or more switchable light states of such embodiments.

A particular advantage of keeping the mould part optically transparent is that when it is formed by an embossing process that relies on rapid ultra-violet (UV) initiated polymerization then absorption of the UV is minimized By contrast, if the mould has light absorbing material then polymerization of deep wall sections (e.g., 20 microns or more) would at least be slowed and most likely would not be possible. In a roll-to-roll process equipped with an embossing drum the mould precursor will have seconds to cure before releasing/peeling from the drum surface. With such a manufacturing process for the mould part it is important to use an optically transparent precursor. Advantageously in embodiments the cast part is cast in place in the device and so cast parts with light absorbing material can be thermally cured over a suitably long time period.

These and other aspects of the present invention will be apparent in view of the following description.

BRIEF DESCRIPTION OF THE DRAWINGS

Embodiments of the invention will now be described, by way of example, with reference to the accompanying three-dimensional drawings, in which:

FIG. 1C shows embodiment 201 including mould microstructure 21 and cast microstructure 81.

FIG. 2A shows first substrate 102 including its mould microstructure 22 and recess 32.

FIG. 3A shows first substrate 103 including its mould microstructure 23 and recess 33.

FIG. 5 shows embodiment 205 comprising embodiment 204 fixed to an active matrix backplane 165.

Figure 1A:
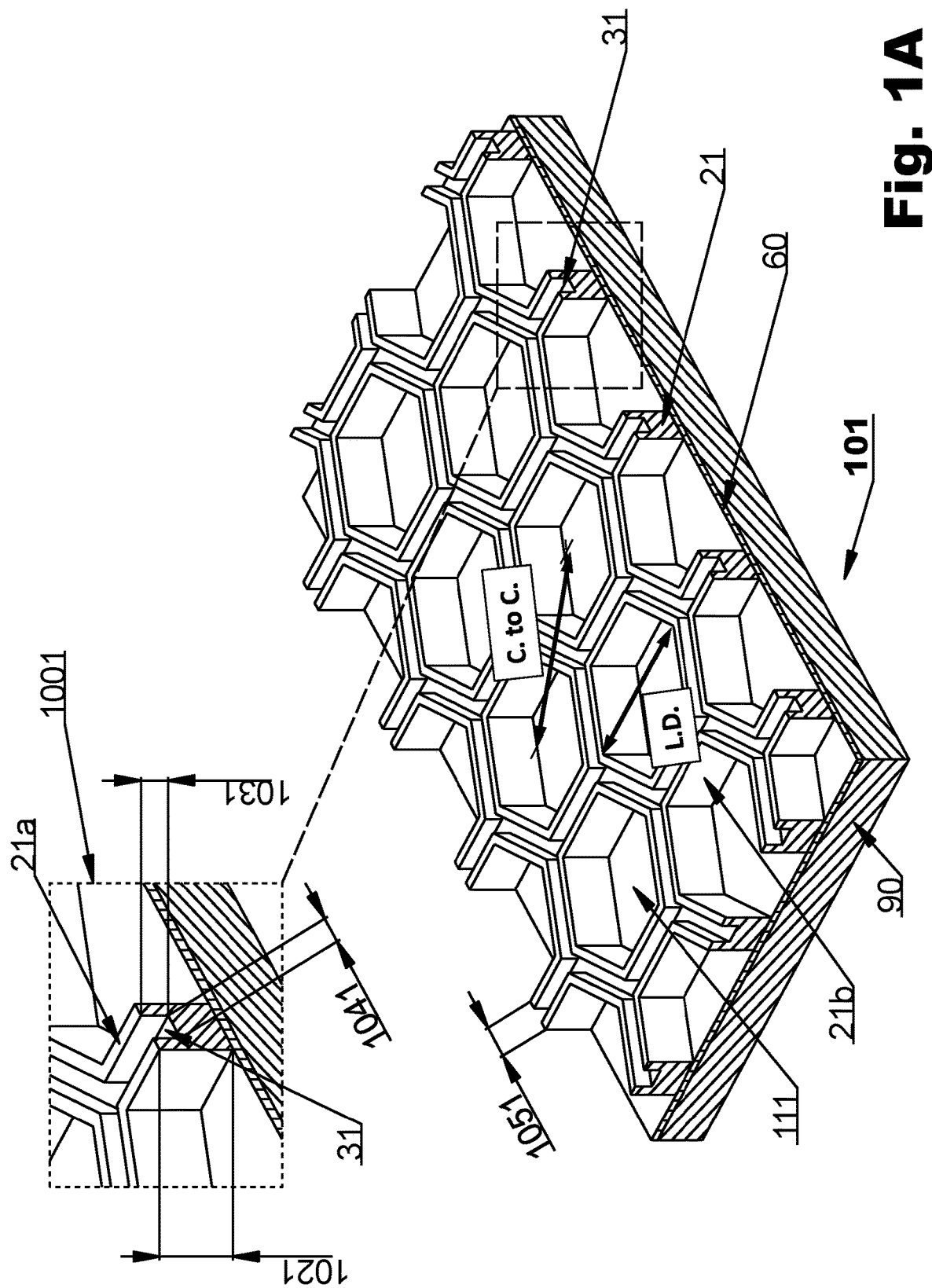
FIG. 1A shows first substrate 101 including its mould microstructure 21 and recess 31.

The drawing depict one or more implementations in accord with the present concepts, by way of example only, not by way of limitations.

DETAILED DESCRIPTION

Embodiments of the present invention provide a switchable light modulator device with a fluid layer. The device has solid polymer structures embedded in its fluid layer and the structures have a height (orthogonal to the juxtaposed major faces of the substrates) and width on the micron scale. The polymer structures are referred to as microstructures (or micro-structures) in this document. The polymer microstructures are arranged in two parts with the first part bonded to the first substrate and the second part bonded to the second substrate. The two parts are also bonded to each other and as a consequence join or fix the substrates of the device to each other. The first part incorporates a wall feature that divides the device's fluid layer into a monolayer of discrete volumes corresponding to cavities, and the second part incorporates a sealant feature that seals the volumes so that cavities are isolated from each other. Even though the second part seals, its polymer structure is near completely isolated from contact with the device's fluid layer by the polymer of the first part.

In embodiments the first part of the two-part polymer structures are referred to as mould microstructures and they are covalently bonded to the inner major face of the first substrate. The mould microstructures are made by microreplicating the surface of a tool onto the first substrate in an embossing or moulding step. The mould microstructures are patterned with recess features (the recess feature could also be called a channel, a notch, or an indentation). In embodiments the recesses are filled by the second part of the two-part polymer structures. This second part is referred to as cast microstructures and they are covalently bonded to the inner face of the second substrate. The cast microstructures replicate the recesses by being cast from them but are not separated from the mould microstructures after casting.

The prepolymer used for casting is printed or otherwise coated to fill the recesses in the mould microstructures. Then the device is assembled with its fluid layer disposed between the opposite spaced apart major surfaces of the first and second substrates. The mould microstructures extend from the major surface of the first substrate into the fluid layer and contact the opposite major face of the second substrate. In this way, the mould microstructures define the cell gap of the fluid layer. At this stage, the recesses are filled with the cast microstructures' prepolymer and the cavities are filled with the fluid. Next, the prepolymer is polymerized in the casting step to form the cast microstructures and covalently bond them to the mould microstructures and to the inner major face of the second substrate. Consequently, the casting step succeeds the moulding step and occurs in place with the fluid layer and between the substrates. During polymerization (i.e., casting) the prepolymer bulk in the recess has no contact with the fluid and after polymerization the cast is enclosed by the mould microstructure and isolated from the fluid. Embodiments are characterised by two-part polymer structures comprising a mould microstructure part and its cast microstructure part.

The light modulator of embodiments selectively changes one or more of light attenuation, colour, specular transmittance, or diffuse reflection in response to electrical, optical or thermal changes and switches providing two or more light states. Preferably, light states include one extreme state that is transparent to visible light and another that strongly attenuates light. An important application for embodiments is in smart windows. Some embodiments incorporate the device into a window as a layer within a glass laminate. In other embodiments, the device is flexible and bonds to a glass pane. In both smart window embodiments, the film device has significant structural strength and compartmentalises the fluid layer with each discrete fluid volume self-sealed. The structural strength of embodiments derives from the design of its mould and cast microstructures and selection of their polymer materials. The structural strength includes that necessary to withstand the glass lamination or bonding process, to withstand the loads encountered when handling and installing large smart windows, and to withstand loads placed on the device over its life by environmental shocks such as wind and temperature extremes. Furthermore, in transport applications the device's polymer structure is selected to be resistant to vibrations.

Other embodiments for the device include use as a light shutter, a light attenuator, a variable light transmittance sheet, a variable light absorptance sheet, a variable light reflectance sheet, a mirror, a sun visor for a vehicle, an electronic skin, a monochrome display, a colour display, or a see-through display. Advantageously, embodiments are particularly suited to applications that require a large area such as from 0.25 M2 to 5 M2. Furthermore, a device that is a roll of film can have an area of 1,000 M2 or more.

Figure 1B:
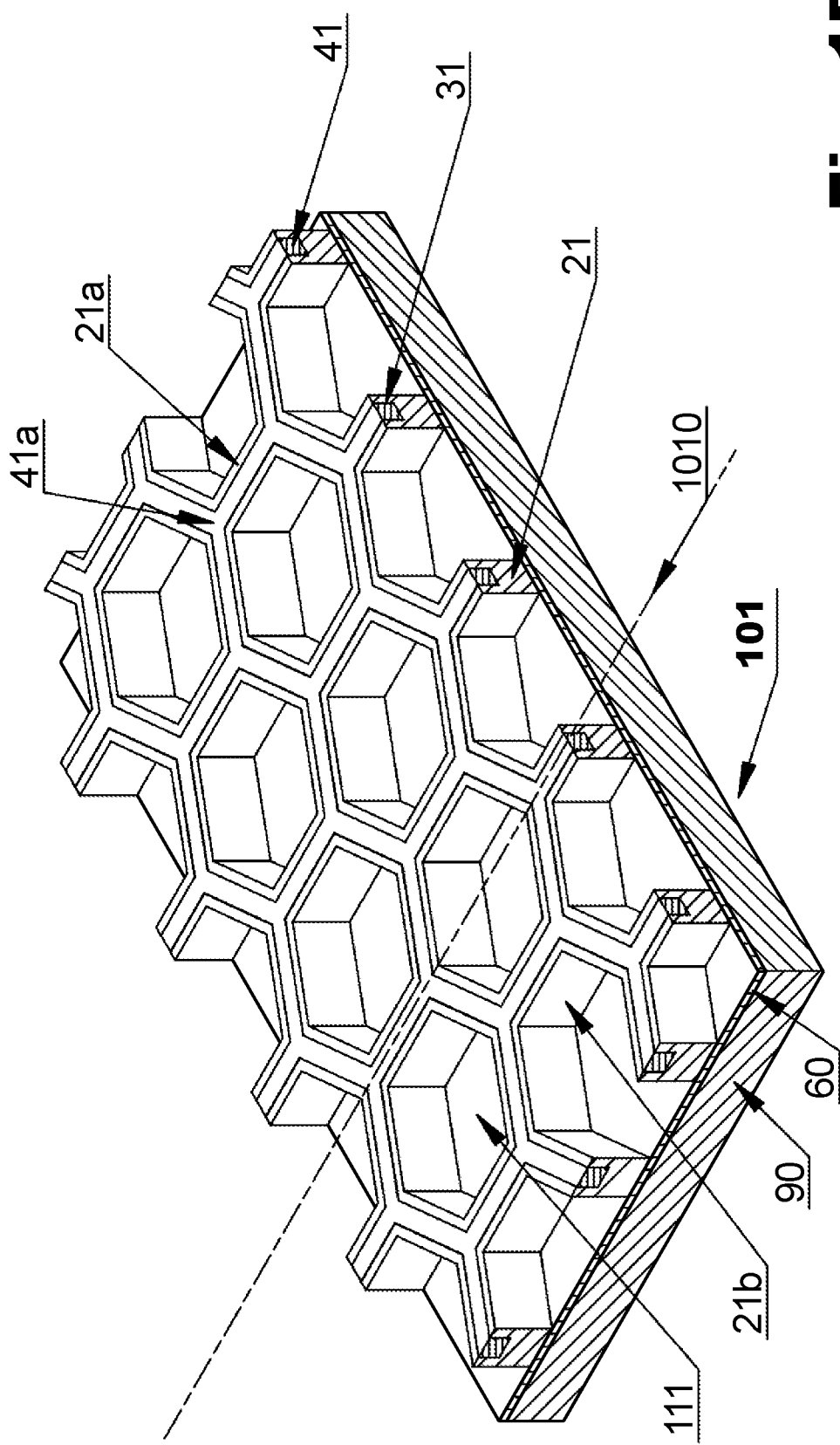
FIG. 1B shows first substrate 101 with recess 31 filled by prepolymer 41.
Figure 2B:
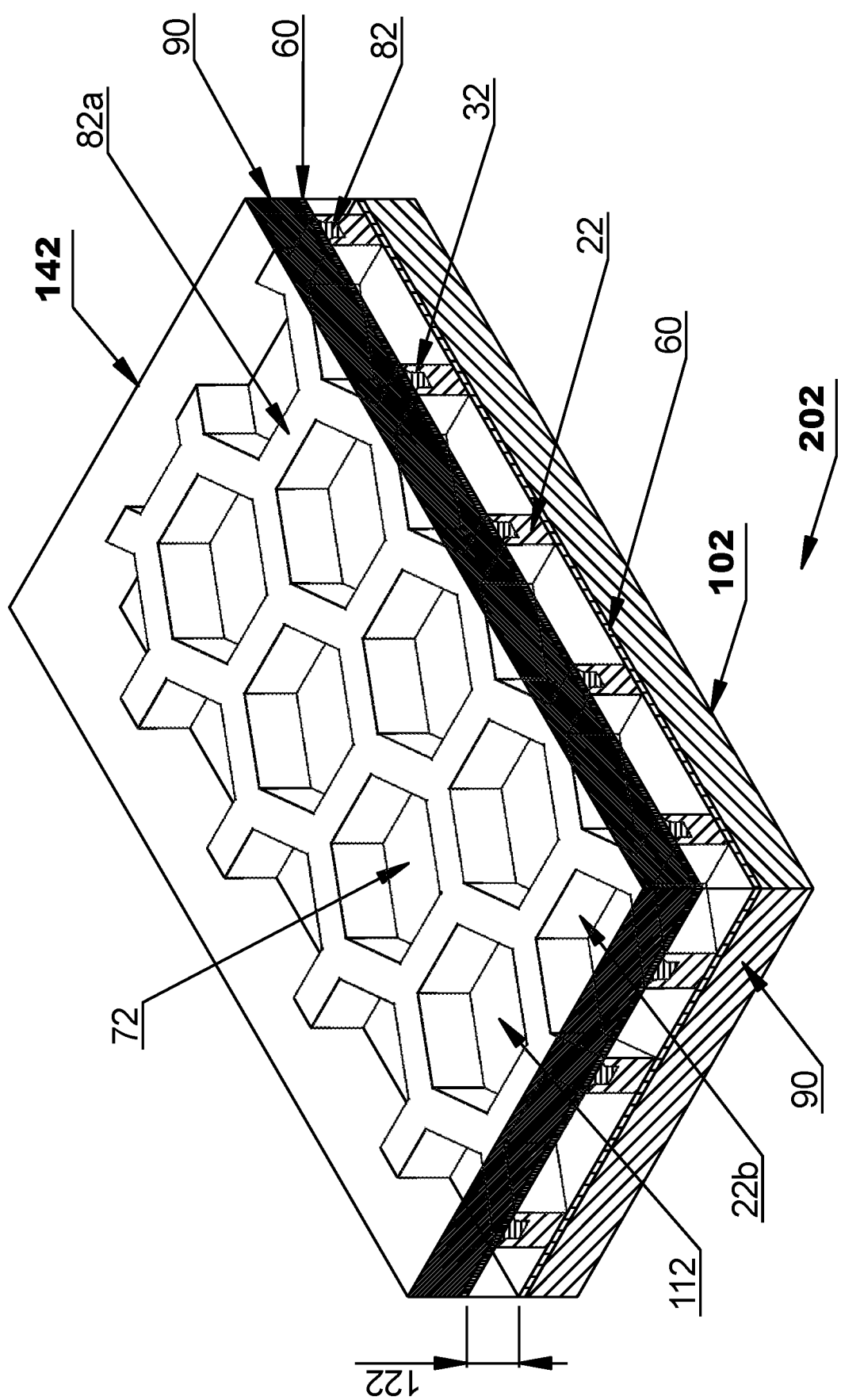
FIG. 2B shows embodiment 202 including mould microstructure 22 and cast microstructure 82.

Embodiments are described with reference to the three dimensional projection views shown in the figures. FIGS. 1a to 1c are used to describe embodiment 201. FIGS. 2A and 2B describe embodiment 202, FIGS. 3A and 3B describe embodiment 203, FIG. 4 describes embodiment 204, and FIG. 5 describes embodiment 205. In the figures the embodiments comprise a fluid or gel layer (71, 72, 73, 74) held between first (101, 102, 103) and second (141, 142, 143, 143) substrates. In some embodiments the fluid layer (71, 72, 73, 74) can be described as an electro-optical layer, e.g., as described above.

The substrates are spaced apart by polymer micro-structures (21, 22, 23) to define a cell gap (121, 122, 123, 124) for the fluid layer. The micro-structures also divide the fluid layer into discrete, sealed cavities (111, 112, 113, 114) or compartments. The micro-structures are in two parts, one part is a mould micro-structure (21, 22, 23) that replicates the surface of a tool and was formed in an embossing or moulding step on the first substrate prior to assembling the device, and the other is a cast micro-structure (81, 82, 83, 84) formed in a recess (31, 32, 33) in the mould microstructure and on the second substrate after assembling the device. Consequently, a cast microstructure derives directly from its interface (or intimate contact, or shared surface) with the recess in the mould's microstructure and its interface (or intimate contact, or shared surface) with the second substrate.

In some embodiments one or both substrates is a transparent flexible film (90) that is coated on the fluid side with a transparent electrode (60). The electrodes' major surfaces face each other and are juxtaposed parallel. The opposite surfaces of the substrates form the viewing faces of the embodiments. In alternative embodiments including photochromic or thermochromic light modulators, the substrates (and device) does not have electrode coatings in the viewing (or switchable area).

In this document the mould microstructures (21, 22, 23) have features described as (or corresponding to) cavity walls (21a, 22a, 23a), recesses (31, 32, 33), recess walls (31a, 32a, 33a), and wall braces (23c). These features, while considered separately from the whole (21, 22, 23) of which they are a part, are formed in a single embossing step. By contrast, the cast microstructures (81, 82, 83, 84) are formed in a separate step and in some embodiments have a different material to the mould microstructures.

In FIGS. 1C, 2B, 3B, 4 and 5 just seven complete fluid cavities (111, 112, 113, 114) are shown with the section cutting through adjacent cavities and the fluid (71, 72, 73, 74) within these cavities. The section through fluid is not shown with hatched lines but the presence of fluid is generally indicated. The figures of embodiments correspond to a local area (or section) of a much larger device and the figures are not to scale. In embodiments the pitch of the cavities (or the fluid volumes defined thereby) is from 50 microns to 3,000 microns. The longest dimension (L.D. in FIG. 1A) for a hexagonal cavity, e.g., as shown in FIG. 1A, may be between 0.3 mm and 3 cm. The corresponding center-to-center distance (C. to C. in FIG. 1A) may be between 0.6 mm and 10 cm. The relationship between the longest dimension of a cavity and the center-to-center distance may vary depending upon the geometry of the cavities with respect to each other. In some instances, the cavities may be a collection of irregular polygons, which may reduce the moiré or other optical interference effect. In one embodiment, a smart glass device with a pitch of 250 microns would typically have between 2,000 and 6,000 discrete fluid cavities across its face and from 2,000 to 20,000 along its face, or a total number of cavities of between 4 million and 120 million. In other embodiments, a larger pitch may be used to improve the viewing experience, i.e., with reduced haze and moiré. When a larger pitch is use, the eye resolves the visible pattern as a grid (or array) and perceives the cast parts as a grid of opaque areas that are the color of the light attenuating particles. In many cases the cast parts are indistinguishable on the face of the light modulator when the light modulator is switched to the first (opaque/darkened) light state. When the light modulator is switched to an open, light-transmissive (second) state, the colored particles collect adjacent the viewable cast parts, effecting an overall appearance of an insect screen. However, the larger size of the cavities greatly improves the haze. Anecdotal studies suggest that for larger applications (e.g., windows of vehicles or buildings) the presence of the viewable cell walls is less objectionable than the higher haze that may be present with smaller pitch designs.

FIG. 1A shows first substrate 101 of embodiment 201 (the latter is shown in FIG. 1C). The mould microstructure 21 is a wall structure that defines hexagonally shaped cavities 111 and is bonded to the inner face of substrate 101. The latter is shown in FIG. 1A as microstructure 21 bonded to the surface of optional electrode 60 on flexible film 90. The cavity wall feature (or constituent) of microstructure 21 is indicated by 21b and its height orthogonal to the substrate face is shown by dimension 1021 and its width by 1051. On the side opposite to substrate 101 the microstructure 21 has a recess 31. The walls (or sides) of microstructure 21 that define recess 31 are indicated by 21a and shown in magnified view 1001. The width of recess 31 is indicated by 1041 and its height by 1031.

The width 1051 of the majority of wall sections embedded in the viewing area is from 7.5 microns to 175 microns, more preferably, from 12 microns to 125 microns, and most preferably, from 15 microns to 90 microns. The width 1041 of the majority of recesses is from 2.5 microns to 100 microns, more preferably, from 7.5 microns to 85 microns, and most preferably, from 10 microns to 75 microns. The height (or depth) 1031 orthogonal to the second substrate's face for the majority of recesses is from 2.5% to 99% of the cell gap 121, more preferable, from 5% to 66%, and most preferably, from 6.25% to 46%.

FIG. 1B shows first substrate 101 after prepolymer 41 was printed or coated into recess 31 in the mould microstructure 21. Examples of suitable printing processes for this step in the device assembly (or preparation or manufacture) include screen printing or ink-jet printing. The preferred printing direction is indicated by arrow 1010. This avoids printing into a recess area that is parallel to the printing squeegee. Prepolymer 41 is the precursor to cast 81. Preferably it is a high viscosity (1,000 cst or more) resin curable by free-radical polymerization (suitable materials are described later). In FIG. 1B the top surface of prepolymer 41 is indicated by 41a. This surface preferably coincides or exceeds the wall surface 21a. In some embodiments an excess of prepolymer 41 can coat the top wall surface 21a after the printing step and before the fluid lamination step.

In FIG. 1C embodiment 201's fluid layer is indicated as 71 and it occupies part of the volume defined between the optional electrodes 60 of substrates 101 and 141. The cell gap 121 corresponds to the orthogonal distance between the respective interfaces of fluid layer 71 with the first and second substrates. Fluid 71 is divided into discrete fluid volumes by the walls 21b that in turn are part of mould microstructure 21 with each fluid volume being defined by a cavity 111. The fluid cavities 111 are side-by-side in a hexagonal grid and are in a monolayer. In some embodiments the cavities have an irregular shape resulting in a side-by-side arrangement having a degree of irregularity or randomness.

Embodiment 201 is assembled in a laminating step using a pair of NIP rollers orientated horizontally and having a vertical direction of feed (w.r.t. passage between the NIP rollers). In some embodiments during lamination the substrates are held under tension by unwinder and/or rewinder stations or modules as part of a roll-to-roll system. The device's fluid 71 is introduced between the substrates 101 and 141 forming a reservoir before passing in a vertical orientation through the NIP rollers. The preferred direction of lamination with respect to the orientation of the hexagonal cavities is indicated by arrow 1010 in FIG. 1B (described earlier in relation to printing prepolymer 41). In this orientation fluid 71 does not experience cavity walls that are parallel to the NIP point of the laminating rollers (i.e. parallel to the rollers) making it easier to force excess fluid from a cavity as the device passes the NIP point. The prepolymer 41 in recess 31 (in the mould microstructure 21) is cast in a curing stage to derive cast microstructure 81 from microstructure 21. Preferably curing is by free-radical polymerization. The latter is preferably accomplished in a high-intensity, ultra-violet radiation module as part of the roll-to-roll process. Alternative curing methods include thermal curing, and alternative types of chain-growth polymerization, include anionic, cationic and coordination polymerization.

Once curing is complete the cast microstructure 81 is strongly bonded to the second substrate 141 and to the mould microstructure 21. Because the cast microstructure 81 is cast in the volume between the mould's recess 31 and the inner face of the second substrate 141, it is surrounded and enclosed by both, and derived and defined by both. The cast 81 replicates both interface surfaces and is a 3D imprint of their surfaces and the volume there between. By selecting the prepolymer 41 to be chemically compatible with both surfaces, the cured cast 81 strongly bonds to both. Cast 81 is the child of parent mould microstructure 21, and the two-parts (or pair) are described as mould 21 and its cast 81.

In another embodiment a thermoplastic polymer is applied in liquid form as prepolymer 41 and allowed solidify before the fluid lamination step. After laminating the fluid 71 between the substrates, the casting step is completed by subjecting the device to high temperature sufficient to cause the thermoplastic polymer 41 to reflow. As it cools thermoplastic polymer 41 bonds to mould microstructure 21 and the second substrate 141 as it solidifies into cast 81. Examples of thermoplastics include poly(methyl methacrylate) (PMMA) (known by trade names such as Lucite®, Perspex® and Plexiglas®) and polycarbonate. Grades suitable for use in outdoor settings and especially automotive applications are preferred. Most preferred are soft thermoplastics with a shore A hardness from 30 to 100 including grades of low density polyethylene (LDPE).

In embodiment 201 the cast 81 is continuous with respect to a cavity 111 and together with the mould 21 surrounds a cavity's fluid 71. The fluid is sealed and isolated from adjacent cavities 111. In FIG. 1C the top surface of cast 81 is shown as 81a and the top surface of mould 21 is shown as 21a. Cast 81 continuously seals a cavity 111 by chemically bonding to the second substrate 141 and to the mould microstructure 21. The latter in turn is continuously sealed by chemical bonding to the first substrate 101. In this way in embodiments the mould microstructure 21 defines a cavity's surrounding walls and the cast microstructure 81 defines a cavity's fluid sealant.

The fluid laminating step (described earlier) substantially forces the fluid out of the contact area between the cast prepolymer 41 and the second substrate 141. Applying compression force while laminating brings the prepolymer 41 into intimate contact with the second substrate 141 and excess prepolymer is squeezed from recess 31 and onto the top of the recess walls 21a in a thin layer. In some embodiments the casting step also seals cavities by polymerizing an excess prepolymer thin layer between the top of the mould microstructure 21 and the second substrate 141. The cured thin layer is also known as flashing. Preferably the cured thin layer has a thickness of less than 5 micron, more preferably, less than 3 microns, and most preferably, less than 2 microns. In some embodiments excess polymer from the cast microstructure extends beyond the mould top surface 21a into the cavity side of the recess walls.

Advantageously in embodiment 201 the fluid 70 has little exposure to the cast's prepolymer 41 as the latter is contained in recess 31. Lamination squeezes the fluid 70 from the contact area of the prepolymer 41 with the second substrate 141 affording little exposure of prepolymer 41 to the fluid during the lamination step and substantially isolating prepolymer 41 (a high viscosity fluid) from the optical fluid 71. The lamination step is a non-permanent sealing of prepolymer 41 between recess 31 and top substrate 141. Immediately after lamination the polymerization step cures the prepolymer making the seal permanent (i.e. by forming cast 81). During polymerization the prepolymer bulk in the recess 31 has no contact with the fluid 70. The only possible contact is with any excess prepolymer squeezed into the cavity during lamination. By selecting and controlling the volume of prepolymer 41 printed into recess 31 excess prepolymer can be minimized or avoided as desired.

In some embodiments the juxtaposed parallel spaced apart (from the first substrate) major surface of the second substrate 141 has a polymer insulating and/or adhesive layer over its electrode layer 60 (not shown in FIG. 1C). In some embodiments the polymer layer is polymerized at the same time as polymerizing the prepolymer 41 of cast 41. In this way the adhesive layer enhances the peel adhesion of the cast 41 to the second substrate.

In device 201 the cell gap 121 is less than or equal to the wall height 1021 of mould microstructure 21 (see FIG. 1A). Advantageously in some embodiments fluid 71 is under suction within cavities 111 because the walls 21b are under compression or load from the fluid laminating step resulting in a reduced wall height within devices corresponding to the cell gap 121. In this document a fluid under suction refers to a fluid that is at a lower pressure to the atmospheric pressure of surroundings. In embodiment 201 a wall height 121 is less than the height outside the device 1021, and preferably the wall height within the device is less than or equal to 0.99 times the height outside the device.

FIG. 2A shows the first substrate 102 of embodiment 202. The latter is shown in FIG. 2B. Embodiment 202 is similar to embodiment 201 described earlier. The walls (or sides) of microstructure 22 that define recess 32 are indicated by 22a and shown in magnified view 1002. The wall height is 1022 and its width is 1052. The width of recess 32 is indicated by 1042 and its height by 1032. The recess 32 has outward sloping curved (or rounded) walls as indicated by 22a in magnified view 1002. In FIG. 2A the walls 22a of the recess 32 narrow to an edge on the side opposite the first substrate.

In FIG. 2B the cavities are 112 and are filled with fluid 72. The cell gap is 122. The walls 22a of the recess 32 narrow to an edge on contacting (or approaching, or adjacent) the second substrate 142. Consequently the top surface 82a of cast 82 overlaps substantially all of the top surface 22a of mould 22 as shown in FIG. 2B. Advantageously, when cast 82 has a colorant and mould 22 is transparent, a viewer perceives both microstructures as being coloured when viewing a viewing face of the embodiment.

In some embodiments the material of the mould and cast microstructures is the same and in others there are differences. In preferred embodiments the mould part is optically transparent and the cast part obscures light and includes one or more of a colorant (pigment or dye), a filler material, or a light scattering material. Preferably, the color of the colorant is selected to match the colour or tint of one or more switchable light states of the switchable light modulator device. For example, an embodiment that has black, clear, and intermediate tinted states has optically clear mould microstructures comprising polymer and black cast microstructures comprising carbon black loaded polymer. In another example an embodiment that has white, clear, and intermediate tinted states has optically clear mould microstructures comprising polymer and white cast microstructures comprising titanium dioxide loaded polymer. In some embodiments having a coloured extreme light state the cast microstructures are black to minimise haze and colour perception in the clear light state.

A particular advantage of keeping the mould part optically transparent is that when it is formed by an embossing process that relies on rapid ultra-violet (UV) initiated polymerization then absorption of the UV is minimized By contrast, if the mould has light absorbing material then polymerisation of deep wall sections (e.g., 20 microns or more) would at least be slowed and most likely would not be possible. In a roll-to-roll process equipped with an embossing drum the mould precursor will have seconds to cure before releasing/peeling from the drum surface. With such a manufacturing process for the mould part it is important to use an optically transparent precursor. Advantageously in embodiments the cast part is cast in place in the device and so cast parts with light absorbing material can be thermally cured over a suitably long time period.

Figure 3B:
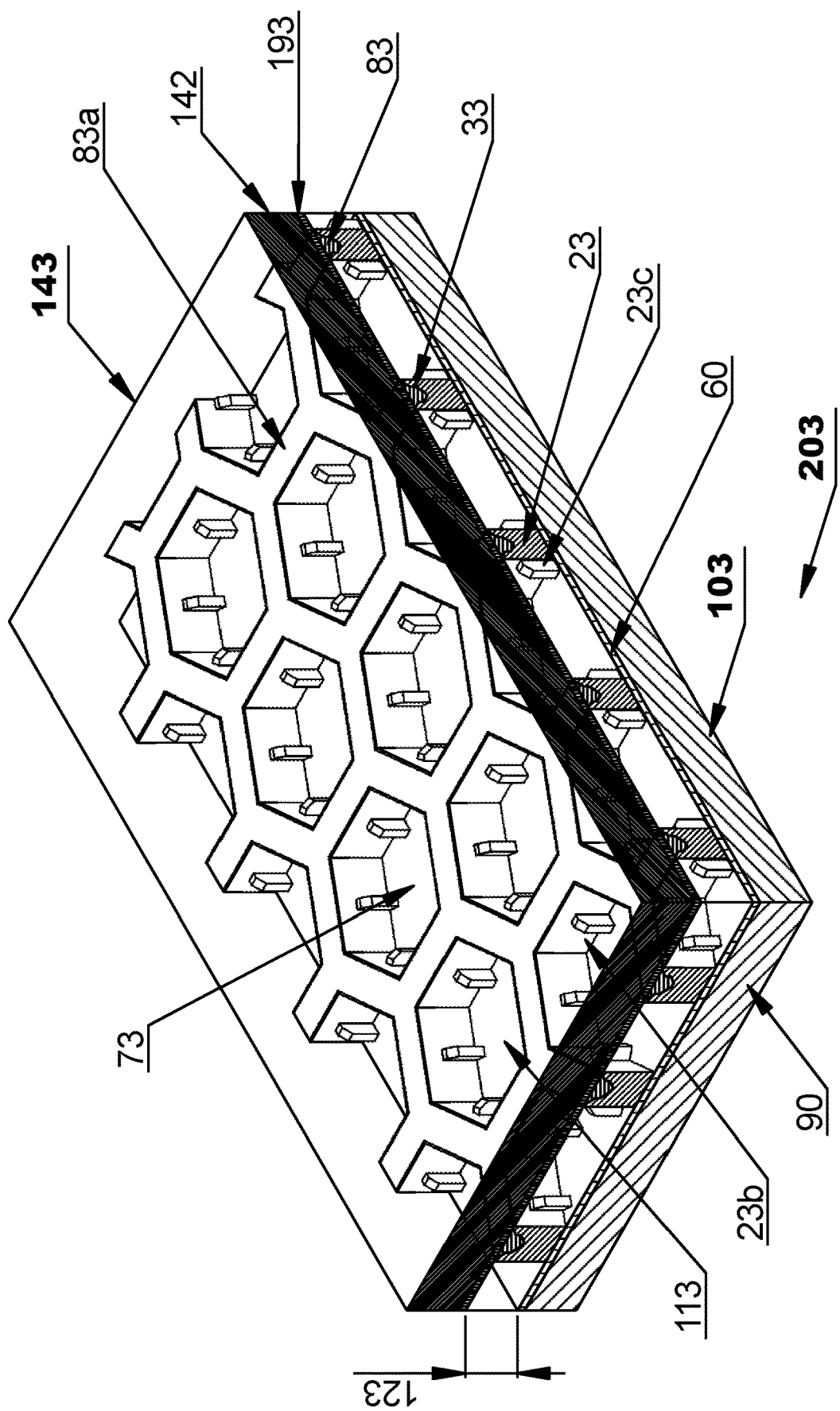
FIG. 3B shows embodiment 203 including mould microstructure 23 and cast microstructure 83.

FIG. 3A shows the first substrate 103 of embodiment 203. The latter is shown in FIG. 3B. Embodiment 203 is similar to embodiments 201 and 202 described earlier. The walls (or sides) of microstructure 23 that define recess 33 are indicated by 23a and shown in magnified view 1003. The cavity walls are indicated by 23b, their height is 1023, and width, 1053. The recess 33 has outward sloping walls as indicated by 23a in magnified view 1003. In FIG. 3A the walls 23a of the recess 33 narrow to a ledge on the side opposite the first substrate. The width of recess 33 is indicated by 1043 within the recess and as 1063 between the ledge areas where the recess is at its widest. The height (or depth) of the recess is indicated by 1033. The recess 33 has a "V" shaped cross section. In some embodiments moulds have differences in the shape of their recesses including variation in the shape, or depth or width of the recesses.

In FIG. 3B, the cavities are 113 and are filled with a liquid crystal fluid 73. The cell gap is 123. The walls 23a of the recess 33 narrow to a ledge on contacting (or approaching, or adjacent) the second substrate 143. Consequently the top surface 83a of cast 83 overlaps substantially all of the top surface 23a of mould 23 as shown in FIG. 3B. The second substrate 143 comprises substrate 142 (shown in FIG. 2B) and a liquid crystal alignment layer 193. Advantageously, the alignment layer 193 can be coated onto the electrode surface of substrate 142 before the liquid crystal fluid is laminated. Subsequently, the cavities 113 are sealed by curing the cast 83. Sealing does not interfere with the alignment layer 193 where it is in contact with the liquid crystal 73.

In FIGS. 3A and 3B the wall feature 23b of the mould microstructure 23 has bracing features 23c. The latter are included to provide additional strength to the walls. This is beneficial when releasing the mould microstructure for the embossing tool (described earlier) and subsequently when the embodiment is laminated between glass panes. The width of bracing feature 23c is shown as 1073 and its height as 1083 in magnified view 1003. In some embodiments the height is the same as the wall height 1023 and preferably in such devices the bracing feature has a recess and the recess is joined to the cavity wall recess. In this way the bracing feature also has an associated cast part and adds to the peel adhesion of the device (the peel adhesion refers to the adhesion between the first and second substrates).

Figure 4:
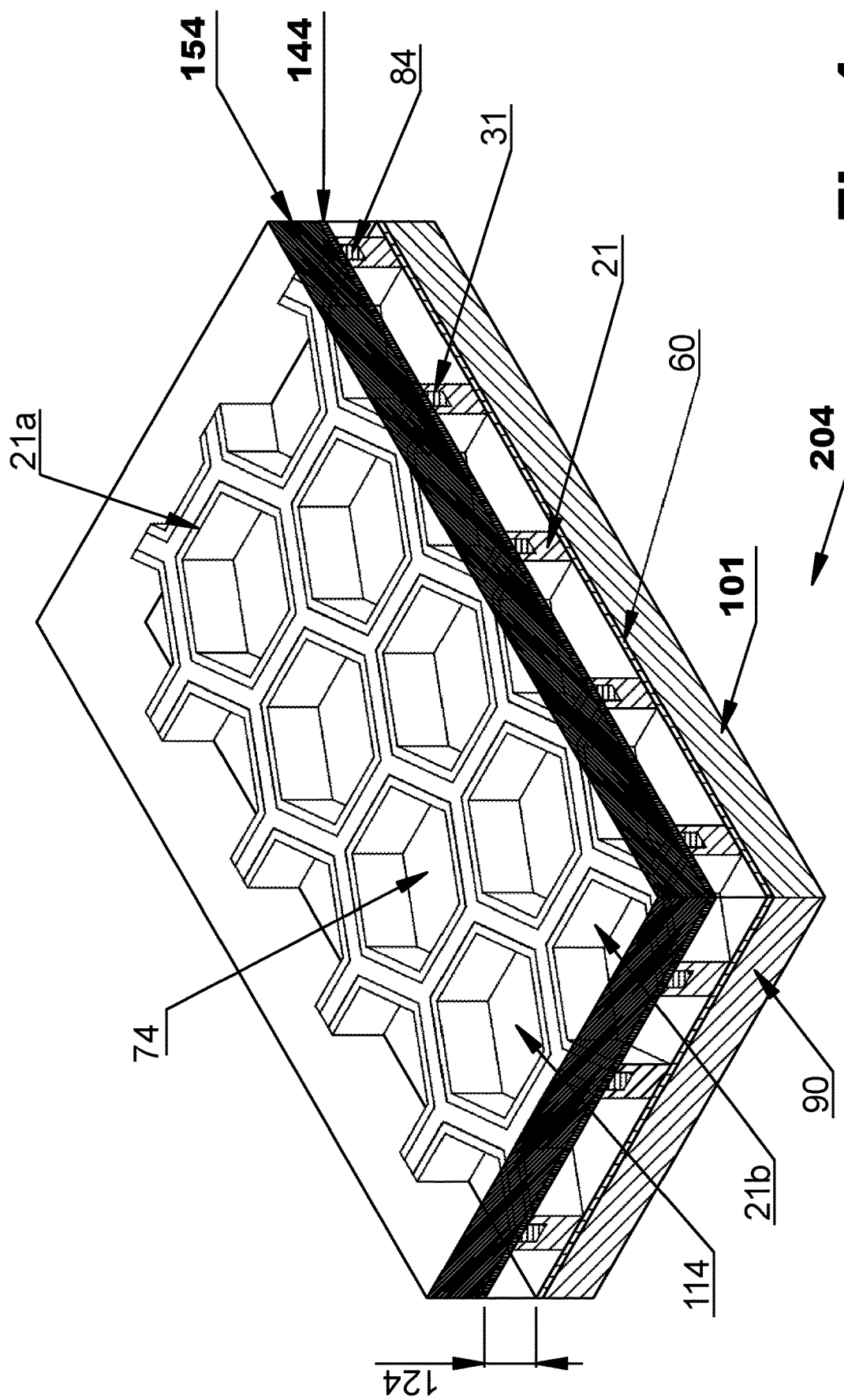
FIG. 4 shows embodiment 204 including mould microstructure 21, cast microstructure 84, and thin second substrate 144.

Device 204 is shown in FIG. 4 and shares many elements with device 201 (shown in FIG. 1C). The common elements are indicated with the same numbers in both figures. The second substrate 144 of device 204 is different to the second substrate 141 of device 201. In FIG. 4 the second substrate 144 is shown fixed to optional release liner 154. As implied by its name, release liner 154 is a sacrificial layer that is intended to be removed when the device is in use (or before in a manufacturing step). The second substrate 144 is continuous and its thickness (or dimension orthogonal to its major faces) is between 0.5 microns and 50 microns, preferably between 1 micron and 35 microns, and most preferably between 1.25 microns and 25 microns.

In some embodiments this thin sheet (i.e. second substrate 144) can be a thin solid polymer and function as one or more of: a covering layer for cavities, an insulating layer, a barrier layer, or a hard coat. In some embodiments the second substrate 144 is optically clear, in other embodiments it has colorant, and in yet other embodiments it reflects sunlight. A distinguishing feature of the second substrate 144 (device 204) w.r.t. second substrate 141 (device 201) is the lack of an electrode layer 60 on the former.

In embodiment 204 cast microstructure 84 is analogous to cast 81 in embodiment 201. Cast 84 is strongly bonded to the second substrate 144 and to the mould microstructure 21. Because the cast microstructure 84 is cast in the volume between the mould's recess 31 and the inner face of the second substrate 144, it is surrounded and enclosed by both, and derived and defined by them both. The cast 84 replicates both interface surfaces and is a 3D imprint of their surfaces and the volume there between.

In FIG. 4, embodiment 204's fluid layer is indicated as 74 and it occupies part of the volume defined between the electrode 60 of substrate 101 and the inner face (or interface) of the second substrate 144. The cell gap 124 corresponds to the orthogonal distance between the respective interfaces of fluid layer 74 with the first and second substrates. Fluid 74 is divided into discrete fluid volumes by the walls 21b that in turn are part of mould microstructure 21 with each fluid volume being defined by a cavity 114. In embodiment 204 the cast 84 is continuous with respect to a cavity 114 and together with the mould 21 surrounds a cavity's fluid 74, sealing and isolating the fluid from adjacent cavities 114.

In some embodiments of device 204 an electrode 60 on the first substrate 101 is patterned into segments and in use the fluid 74 is subjected to the influence of an electrical field by applying different voltage polarities and/or levels to adjacent segments. In such a device the second substrate may not have an electrode layer associated with it (i.e. the device forms light states with a single electrode layer and can be said to use in-plane switching).

Embodiment 205 is shown in FIG. 5 and includes embodiment 204 as indicated (with release liner 154 removed) fixed to an active matrix backplane 165. The fixing can be by any suitable means including by adhesive (not shown in FIG. 5). If an adhesive/polymer layer is used then preferably its thickness is kept to the minimum necessary (i.e. from 0.5 micron to 15 microns) to uniformly fix device 204 to backplane 165 and achieve adequate peel adhesion between the parts. The active matrix backplane 165 has electrodes patterned to form pixels and together with active matrix transistors allow device 205 to operate embodiment 204 as a matrix of pixel areas from which arbitrary images can be displayed. Examples of products (205) include ebook readers and electronic shelf labels.

In some embodiments, a switchable light modulator device includes one of the following types, or hybrid versions thereof: an electrophoretic device, a liquid crystal device, an electro-wetting device, an electrokinetic device, an electrochromic device incorporating an electrolytic fluid/gel, a thermochromic device, or a photochromic device. Advantageously in some embodiments the fluid layer has contact with part of the juxtaposed parallel spaced apart major surfaces of the substrates including a substrate surface comprising: an electrode layer (60), an inorganic dielectric layer, an organic dielectric layer, an alignment layer (193), an electrochromic layer, an ion storage layer, or an active matrix layer. In electrochromic embodiments the fluid is an electrolytic gel and has contact with an electrochromic layer that overlays an electrode on one substrate and an ion storage layer that overlays the other electrode on the other substrate. An example of an electrochromic device is described in Gentex's U.S. Pat. No. 6,934,067. In a hybrid electrochromic/photochromic embodiment the switchable material is a liquid or gel. The switchable liquid or gel is described in Switch Material's U.S. Pat. No. 8,837,032. In a liquid crystal device the fluid is preferably a chiral nematic liquid crystal and a suitable device is described by the applicant in British Patent Application No. 1416385.1 titled "A Chiral Nematic Liquid Crystal Light Shutter". An electrokinetic device is a hybrid of an electrophoretic device and comprises an ink that includes charged particles suspended in a fluid; see for example Crown Electrokinetics US 2019/0256625. In an electrowetting embodiment the fluid layer can comprise fluids described in Sun Chemical Corp.'s U.S. Pat. No. 8,854,714.

To enhance peel adhesion in some embodiments isolated mould and cast parts can be located within a cavity. For example, a cavity can have a centrally located post with a recess (the mould microstructure) and be bonded to the opposing substrate through a cast microstructure cured in its recess. This provides peel adhesion within a cavity that supplements the peel adhesion provided by the cavity walls. The centrally located microstructures also act as additional spacers in the fluid layer making a device more resistant to externally applied point pressure.

In some embodiments a peripheral edge seal about the viewing area uses mould and cast polymer parts. The mould part of the edge seal is replicated onto its substrate in a moulding or embossing step at the same time as the mould microstructures are replicated. Devices made with such a peripheral edge seal are suited to the volume production of identical devices such as automotive sunroofs or visors. The device can be produced as a repeated device on a continuous roll of film and then stamp cut or laser cut from the roll of film.

In some embodiments the added peel adhesion of the peripheral edge seal is well suited to more extreme conditions such as when the device's edges are exposed. For example, a smart window embodiment can be bonded to a glass pane on one side only leaving its other substrate and edge area exposed.

The substrates (101, 102, 103, 141, 142, 143) can be any suitable transparent sheet material such as polymer or glass and can be flexible or rigid. Flexible substrates include a polymer such as PET (i.e. polyethylene terephthalate), PEN (i.e. polyethylene napthalate), PES (i.e. polyether sulfone), PC (i.e. polycarbonate), PI (i.e. polyimide), or PRP (i.e. fiber reinforced plastic), or flexible glass (e.g., 50 micron or 100 micron glass from Nippon Electric Glass Co. Ltd.). A rigid substrate can use float glass, or heat treated float glass, or polished glass, or tinted/colored glass, or heat absorbing/reflecting glass, or an active matrix glass.

Electrodes (60) can be any suitable transparent conductor. For example, ITO (i.e. indium tin oxide), carbon nanotubes, silver nanowires, or a conductive polymer such as PEDOT (i.e. poly(ethylenedioxythiophene). A top electrode can be one type such as ITO and a bottom electrode another type such as PEDOT. PEDOT coated PET substrates are available from Kodak (US), and ITO coated PET substrates are available from Sheldahl (US).

In flexible embodiments the microstructures and the substrates have sufficient flexibility to allow the device to conform to the curvature of a cylinder of radius 300 mm, and preferably, radius 100 mm, and most preferably, radius 50 mm.

As described earlier for some embodiments, the polymer used in a cast microstructure is cured by photo or thermal means and covalently bonds to its surrounding mould microstructure and the inner surface of its boundary substrate. Preferably the cast's prepolymer is not soluble in the fluid of the fluid layer and has a majority by weight of high molecular weight components and a high viscosity. In some embodiments the mould and cast microstructures are at least as flexible as a device's substrates.

A suitable flexible (or deformable) polymer for use preferably in the mould (21, 22, 23) and cast (81, 82, 83) microstructures of embodiments includes thermosetting polymers and more especially, elastomeric solid polymer. The elastomer is characterized by a glass transition temperature (i.e. Tg) less than 20 degrees Celsius (i.e. 293K) and possessing crosslinks. In some embodiments Tg is less than the minimum operating temperature required for an application. In some embodiments the rigidity of a microstructure's elastomer polymer can be selected using the level of crosslinking. In some embodiments an elastomer can be filled with dispersed hard material (i.e. filler) to increase its rigidity, tear strength and durability under loading. Examples of filler material include precipitated silica, fumed silica, ground quartz, black pigment nanoparticles, carbon fibers or nanoparticles, or ceramic fibers or nanoparticles. In embodiments the elastic modulus of the solid polymer is selected to provide suitable elastic deforming of the mould and cast microstructures, and the modulus lies in the range 2 MPa to 200 MPa, and more preferably, 3 MPa to 100 MPa. In embodiments the tear strength of the solid polymer used in the microstructures is selected to lie in the range 7.5 kN/m to 75 kN/m at 20 degrees Celsius, and more preferably, 9 kN/m to 50 kN/m. The minimum tear strength at the maximum operating temperature (e.g., 90 degrees Celsius) is selected to be >7.5 kN/m. In embodiments the linear thermal expansion coefficients of the polymers used in the mould and cast microstructures are matched.

In preferred embodiments the elastomer for one or both microstructure parts (i.e. the mould and cast parts) is polyurethane (i.e. contains polyurethane linkages). Preferred polyurethanes have acrylate/methacrylate groups that are cured to form crosslinks. In some embodiments the polymer precursor formulation has di-functional polyurethane chains in solution with mono-functional monomers. Both of these components can be fluorinated to improve chemical resistance to swelling by an embodiment's fluid (71, 72, 73, 74).

Commercially available examples of optical grade prepolymer suitable for use as the elastomeric polymer in embodiments includes the following from Norland Products (www.norlandprod.com): NOA78, NOA75, NOA68, NOA68T, and fluorinated grades NOA142, NOA139, NOA, 138, and NOA13825.

To minimize haze some embodiments match the refractive indices of the mould and cast microstructures to the fluid, preferably to within 0.02 of each other, more preferably, 0.005, and most preferably, 0.002. Other embodiments include a colorant in the polymer of the cast microstructures to absorb and/or reflect light. Preferably solar pigments that reflect the sunlight infra-red spectrum are used for the colorant. Preferably the colorant is black to avoid light scattering (and consequently haze). A black colorant in the solid polymer of the cast microstructures allows mismatched refractive indices for the fluid and the black solid polymer. Furthermore, embodiments that use black colorant in the solid polymer of the cast microstructures can use polymer that is not optically transparent. For example, as described earlier the solid polymer can incorporate dispersed, hard filler material. In another example the polymer can have a semi-crystalline structure.

To provide in-plane (i.e. within the electro-optical layer) switching in some embodiments the polymer of the cast microstructures is conductive and the cast microstructures also function as cast electrodes within the device.

Next, moulding techniques are described to make the mould microstructures within embodiments. The moulding techniques can also be described as replication techniques. These and other suitable replication techniques are described in the Vlyte Innovations' EP3396446 titled "An Electrophoretic Device Having a Transparent Light State".

In a moulding technique a hard or soft tool surface is used as a negative mould master and in moulding steps the inverse of the three dimensional (3D) shape of the master's surface is transferred to (i.e. replicated) a substrate to form the mould microstructures. An example of a hard tool surface is electroformed nickel and its surface is suitable for making up to 100,000 replicas onto a substrate. An example of a soft tool surface is cross-linked polydimethylsiloxane and it can make up to 1,000 replicas. The moulding steps comprise coating the master's surface with a prepolymer and laminating the substrate (optionally the coating is done as part of laminating), curing the coating to inversely replicate the shape of the master's surface in polymer bonded to the substrate, and peeling from the master leaving the replicated microstructure on the substrate.

The mould microstructures of a device can be repeated (by replication) continuously on a roll of film in a roll-to-roll process. In this case, the surface of a drum is the hard tool. Alternatively, a continuous roll of film can be cut into sheets corresponding to a device, and then the mould microstructures replicated on each substrate in a sheet process. In this case, an electroformed sheet is a suitable hard tool or P(DMS) on PET is a suitable soft tool.

A hard, negative, mould master can be made from a polymer template by electroforming nickel onto the template's surface and thereby transferring the polymer template's shape to the surface of a hard mould master. The polymer template's surface is directly formed by optically writing a microstructure into a photosensitive polymer known as a photoresist and developing the resist. The direct writing of the template's surface in a photosensitive polymer includes the technologies described as direct-write lithography, single-point laser writing, laser interferometry, and electron-beam lithography. Any suitable photoresist can be used including the SU8 series available from www.microchem.com. Directly writing the microstructure exposes the photosensitive polymer and the exposed structure is developed in solution in a separate step. Preferably, a computer controlled system uses a laser beam or electron beam (e-beam) to expose the photosensitive polymer and form the mould microstructures with wall features and recess features. Prior to electroforming the negative mould master on the surface of the polymer template, the template is made more compatible (with electroforming) by depositing a thin (<250 nm) metallic or ceramic conformal coating (or coatings) onto its polymer surface.

In other techniques, the three-dimensional surface in a hard master (e.g., stainless steel, copper, electroformed nickel, silicon, fused silica, or calcium fluoride) is directly formed by material removal. The hard surface can be formed by mechanical milling (e.g., Single Point Diamond Turning), chemical etching, ion-beam milling, reactive-ion etching, or laser ablation to directly form (or write) the replicating surface. Typically, the inverse image (i.e. the negative) is directly formed in a small area called a tile and metal foil copies of this area (called shims) used to cover the tool surface, such as the surface of an embossing drum. It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

All of the foregoing published patents, publications, and pending applications are incorporated by reference herein in their entireties.

We claim:

1. A switchable light modulator (201, 202, 203, 204, 205) comprising:
    a first substrate (101, 102, 103) having a first major surface;
    a second substrate (141, 142, 143, 144) having a second major surface;
    a polymer wall structure (21, 22, 23) having a top and a bottom, the polymer wall structure being disposed between the first major surface and the second major surface, thereby creating a plurality of cavities (111, 112, 113, 114) that contain a modulating fluid (71, 72, 73, 74) or a modulating gel in discrete volumes within the cavities (111, 112, 113, 114), wherein the polymer wall structure (21, 22, 23) includes a mould part (31, 32, 33) defining a recess along the top of the polymer wall structure (21, 22, 23), wherein the recess has a maximum depth (1031, 1032) that is greater than or equal to 5% of the orthogonal distance (121, 122) between the first major surface and the second major surface; and
    a cast part (81, 82, 83, 84) formed by disposing a fluid pre-cursor into the recess and filling the recess, and subsequently curing the fluid pre-cursor to bond the second substrate to a surface of the recess.

2. The switchable light modulator of claim 1, wherein the bottom of the polymer wall structure is bonded to the first substrate.

3. The switchable light modulator of claim 1, wherein the fluid pre-cursor does not contact the modulating fluid or the modulating gel.

4. The switchable light modulator of claim 1, wherein the fluid pre-cursor extends beyond side walls (21a, 22a, 23a) defining the recess, and into the cavity.

5. The switchable light modulator of claim 1, wherein the mould part is optically transparent and the cast part obscures light and includes a colorant, a filler material, or a light scattering material.

6. The switchable light modulator of claim 5, wherein the mould includes a colorant, and the colorant matches a colour of a particle that is disposed in the modulating fluid or modulating gel.

7. The switchable light modulator of claim 1, wherein the fluid pre-cursor comprises an elastomeric polymer having a glass transition temperature (Tg) less than 20° C.

8. The switchable light modulator of claim 7, wherein the elastomer polymer is a polyurethane.

9. The switchable light modulator of claim 1, wherein the cavities are between 0.3 mm and 3 cm in longest dimension, and the center-to-center distance of adjacent cavities is between 0.6 mm and 10 cm.

10. The switchable light modulator of claim 1, wherein mould parts have differences in the respective shapes of their recesses including variation in the depth (1031, 1032) and width (1041, 1042) of the recesses.

11. The switchable light modulator of claim 1, wherein the polymer wall structures additionally include bracing features (23*c*).

12. The switchable light modulator of claim 1, wherein the first substrate or the second substrate comprises a flexible transparent material (90).

13. The switchable light modulator of claim 1, wherein the switchable light modulator has a first state that strongly attenuates light, and a second state that is substantially transparent to visible light.

14. The switchable light modulator of claim 1, wherein the modulating fluid or the modulating gel includes electrophoretic particles, liquid crystals, a combination of polar and non-polar liquids, an electrochromic fluid, a thermochromic fluid, or a photochromic fluid.

15. A display, a window, a mirror, a sun shade, or a sign including a switchable light modulator of claim 1.

16. A switchable light modulator (201, 202, 203, 204, 205) comprising:
a first substrate (101, 102, 103) having a first major surface;
a second substrate (141, 142, 143, 144) having a second major surface;
a polymer wall structure (21, 22, 23) having a top and a bottom, the polymer wall structure being disposed between the first major surface and the second major surface, thereby creating a plurality of cavities (111, 112, 113, 114) that contain a modulating fluid (71, 72, 73, 74) or a modulating gel in discrete volumes within the cavities (111, 112, 113, 114), wherein the polymer wall structure (21, 22, 23) includes a mould part (31, 32, 33) defining a recess along the top of the polymer wall structure (21, 22, 23); and
a cast part (81, 82, 83, 84) formed by disposing a fluid pre-cursor into the recess and filling the recess, and subsequently curing the fluid pre-cursor to bond the second substrate to a surface of the recess, wherein the fluid pre-cursor comprises an elastomeric polymer having a glass transition temperature (Tg) less than 20° C.

17. The switchable light modulator of claim 16, wherein the bottom of the polymer wall structure is bonded to the first substrate.

18. The switchable light modulator of claim 16, wherein the fluid pre-cursor does not contact the modulating fluid or the modulating gel.

19. The switchable light modulator of claim 16, wherein the fluid pre-cursor extends beyond side walls (21*a*, 22*a*, 23*a*) defining the recess, and into the cavity.

20. The switchable light modulator of claim 16, wherein the mould part is optically transparent and the cast part obscures light and includes a colorant, a filler material, or a light scattering material.

21. The switchable light modulator of claim 20, wherein the mould includes a colorant, and the colorant matches a colour of a particle that is disposed in the modulating fluid or modulating gel.

22. The switchable light modulator of claim 16, wherein the elastomer polymer is a polyurethane.

23. The switchable light modulator of claim 16, wherein the cavities are between 0.3 mm and 3 cm in longest dimension, and the center-to-center distance of adjacent cavities is between 0.6 mm and 10 cm.

24. The switchable light modulator of claim 16, wherein mould parts have differences in the respective shapes of their recesses including variation in the depth (1031, 1032) and width (1041, 1042) of the recesses.

25. The switchable light modulator of claim 16, wherein the polymer wall structures additionally include bracing features (23*c*).

26. The switchable light modulator of claim 16, wherein the first substrate or the second substrate comprises a flexible transparent material (90).

27. The switchable light modulator of claim 16, wherein the switchable light modulator has a first state that strongly attenuates light, and a second state that is substantially transparent to visible light.

28. The switchable light modulator of claim 16, wherein the modulating fluid or the modulating gel includes electrophoretic particles, liquid crystals, a combination of polar and non-polar liquids, an electrochromic fluid, a thermochromic fluid, or a photochromic fluid.

29. A display, a window, a mirror, a sun shade, or a sign including a switchable light modulator of claim 16.

30. A switchable light modulator (201, 202, 203, 204, 205) comprising:
a first substrate (101, 102, 103) having a first major surface;
a second substrate (141, 142, 143, 144) having a second major surface;
a polymer wall structure (21, 22, 23) having a top and a bottom, the polymer wall structure being disposed between the first major surface and the second major surface, thereby creating a plurality of cavities (111, 112, 113, 114) that contain a modulating fluid (71, 72, 73, 74) or a modulating gel in discrete volumes within the cavities (111, 112, 113, 114), wherein the cavities are between 0.3 mm and 3 cm in longest dimension, and the center-to-center distance of adjacent cavities is between 0.6 mm and 10 cm, and wherein the polymer wall structure (21, 22, 23) includes a mould part (31, 32, 33) defining a recess along the top of the polymer wall structure (21, 22, 23); and
a cast part (81, 82, 83, 84) formed by disposing a fluid pre-cursor into the recess and filling the recess, and subsequently curing the fluid pre-cursor to bond the second substrate to a surface of the recess.

31. The switchable light modulator of claim 30, wherein the bottom of the polymer wall structure is bonded to the first substrate.

32. The switchable light modulator of claim 30, wherein the fluid pre-cursor does not contact the modulating fluid or the modulating gel.

33. The switchable light modulator of claim 30, wherein the fluid pre-cursor extends beyond side walls (21a, 22a, 23a) defining the recess, and into the cavity.

34. The switchable light modulator of claim 30, wherein the mould part is optically transparent and the cast part obscures light and includes a colorant, a filler material, or a light scattering material.

35. The switchable light modulator of claim 34, wherein the mould includes a colorant, and the colorant matches a colour of a particle that is disposed in the modulating fluid or modulating gel.

36. The switchable light modulator of claim 30, wherein mould parts have differences in the respective shapes of their recesses including variation in the depth (1031, 1032) and width (1041, 1042) of the recesses.

37. The switchable light modulator of claim 30, wherein the polymer wall structures additionally include bracing features (23c).

38. The switchable light modulator of claim 30, wherein the first substrate or the second substrate comprises a flexible transparent material (90).

39. The switchable light modulator of claim 30, wherein the switchable light modulator has a first state that strongly attenuates light, and a second state that is substantially transparent to visible light.

40. The switchable light modulator of claim 30, wherein the modulating fluid or the modulating gel includes electrophoretic particles, liquid crystals, a combination of polar and non-polar liquids, an electrochromic fluid, a thermochromic fluid, or a photochromic fluid.

41. A display, a window, a mirror, a sun shade, or a sign including a switchable light modulator of claim 30.

42. A switchable light modulator (201, 202, 203, 204, 205) comprising:
- a first substrate (101, 102, 103) having a first major surface;
- a second substrate (141, 142, 143, 144) having a second major surface;
- a polymer wall structure (21, 22, 23) having a top and a bottom, the polymer wall structure being disposed between the first major surface and the second major surface, thereby creating a plurality of cavities (111, 112, 113, 114) that contain a modulating fluid (71, 72, 73, 74) or a modulating gel in discrete volumes within the cavities (111, 112, 113, 114), wherein the polymer wall structure (21, 22, 23) includes a mould part (31, 32, 33) defining a recess along the top of the polymer wall structure (21, 22, 23); and
- a cast part (81, 82, 83, 84) formed by disposing a fluid pre-cursor into the recess and filling the recess, and subsequently curing the fluid pre-cursor to bond the second substrate to a surface of the recess, wherein the fluid pre-cursor does not contact the modulating fluid or the modulating gel.

43. A switchable light modulator (201, 202, 203, 204, 205) comprising:
- a first substrate (101, 102, 103) having a first major surface;
- a second substrate (141, 142, 143, 144) having a second major surface;
- a polymer wall structure (21, 22, 23) having a top and a bottom, the polymer wall structure being disposed between the first major surface and the second major surface, thereby creating a plurality of cavities (111, 112, 113, 114) that contain a modulating fluid (71, 72, 73, 74) or a modulating gel in discrete volumes within the cavities (111, 112, 113, 114), wherein the polymer wall structure (21, 22, 23) includes a mould part (31, 32, 33) defining a recess along the top of the polymer wall structure (21, 22, 23); and
- a cast part (81, 82, 83, 84) formed by disposing a fluid pre-cursor into the recess and filling the recess, and subsequently curing the fluid pre-cursor to bond the second substrate to a surface of the recess, wherein the cast part obscures light and includes a colorant, a filler material, or a light scattering material, and wherein the mould includes a colorant, and the colorant matches a colour of a particle that is disposed in the modulating fluid or modulating gel.

44. A switchable light modulator (201, 202, 203, 204, 205) comprising:
- a first substrate (101, 102, 103) having a first major surface;
- a second substrate (141, 142, 143, 144) having a second major surface;
- a polymer wall structure (21, 22, 23) having a top and a bottom, the polymer wall structure being disposed between the first major surface and the second major surface, thereby creating a plurality of cavities (111, 112, 113, 114) that contain a modulating fluid (71, 72, 73, 74) or a modulating gel in discrete volumes within the cavities (111, 112, 113, 114), wherein the polymer wall structure (21, 22, 23) includes mould parts (31, 32, 33) defining recesses along the top of the polymer wall structure (21, 22, 23), and wherein the mould parts have differences in the respective shapes of their recesses including variation in the depth (1031, 1032) and width (1041, 1042) of the recesses; and
- a cast part (81, 82, 83, 84) formed by disposing a fluid pre-cursor into the recess and filling the recess, and subsequently curing the fluid pre-cursor to bond the second substrate to a surface of the recess.

* * * * *